United States Patent [19]

Furuno et al.

[11] Patent Number: 5,363,149
[45] Date of Patent: Nov. 8, 1994

[54] PROJECTION TELEVISION SET

[75] Inventors: Takashi Furuno; Toshiya Wakasa; Jun Iizuka; Kanehiro Hagiwara; Mitsuyoshi Mitake, all of Tokyo, Japan

[73] Assignee: Pioneer Electronic Corporation, Tokyo, Japan

[21] Appl. No.: 49,772

[22] Filed: Apr. 21, 1993

[30] Foreign Application Priority Data

| Apr. 23, 1992 | [JP] | Japan | 4-104801 |
| Apr. 23, 1992 | [JP] | Japan | 4-104804 |
| Apr. 23, 1992 | [JP] | Japan | 4-104805 |

[51] Int. Cl.⁵ .......................................... H04N 5/64
[52] U.S. Cl. .................................... 348/789; 348/782; 348/784; 359/456; 359/457; 353/72; 312/7.2
[58] Field of Search ............... 358/60, 61, 62, 63, 358/64, 65, 231, 232, 233, 236, 237, 238, 239, 254, 250, 251, 252, 253, 56; 312/7.1, 10.1; 353/47, 72, 73, 74; 359/443, 455, 457, 460, 444; 348/744, 776, 778, 779, 781–784, 787, 788, 789, 836–843, 794; H04N 5/74, 9/32, 5/72, 5/64

[56] References Cited

U.S. PATENT DOCUMENTS

| 4,577,928 | 3/1986 | Brown ................................ 358/255 |
| 4,903,137 | 2/1990 | Wakasa .............................. 358/254 |
| 5,011,277 | 4/1991 | Igino et al. . |
| 5,085,495 | 2/1992 | Iwagara et al. . |

FOREIGN PATENT DOCUMENTS

| 331847 | 9/1989 | European Pat. Off. . |
| 464663 | 1/1992 | European Pat. Off. . |
| 2561792 | 9/1985 | France . |
| 0127368 | 8/1982 | Japan ........................ H04N 5/74 |
| 0161585 | 9/1983 | Japan ........................ H04N 5/74 |
| 63-88976 | 4/1988 | Japan . |
| 0120983 | 5/1989 | Japan ........................ H04N 9/31 |
| 0373938 | 3/1991 | Japan . |
| 0226190 | 10/1991 | Japan ........................ H04N 5/74 |

OTHER PUBLICATIONS

Communication dated Aug. 3, 1993 with attached European Search Report.
Patent Abstracts of Japan–Publication No. JP2295293.
Co-pending Application entitled Projection Television Set filed concurrently. 08/050,549.

*Primary Examiner*—James J. Groody
*Assistant Examiner*—Michael H. Lee
*Attorney, Agent, or Firm*—Kane, Dalsimer, Sullivan, Kurucz, Levy, Eisele and Richard

[57] ABSTRACT

A projection television set includes a body composed of at least two divided upper and lower units, a screen assembly having an integrally formed screen corresponding to the body, and a plurality of bolt and nut assemblies for coupling the divided units together. Each of the upper and lower units has a projector for emitting light rays for forming an image on a screen and a reflector for reflecting the light rays from the projector onto the screen. The projector of the lower unit is arranged below the reflector of the lower unit, and the projector of the upper unit is arranged in an intermediate position between the reflector of the upper unit and the reflector of the lower unit so that setting angles of the two reflectors are different from each other. A screen assembly is mounted on a front face of the body. A hook member is mounted on a frame of the screen assembly, a hook receiving member is mounted on the body casing, and the screen assembly is supported by the hook receiving member and freely rotatable about the hook receiving member.

19 Claims, 22 Drawing Sheets

F I G. 10
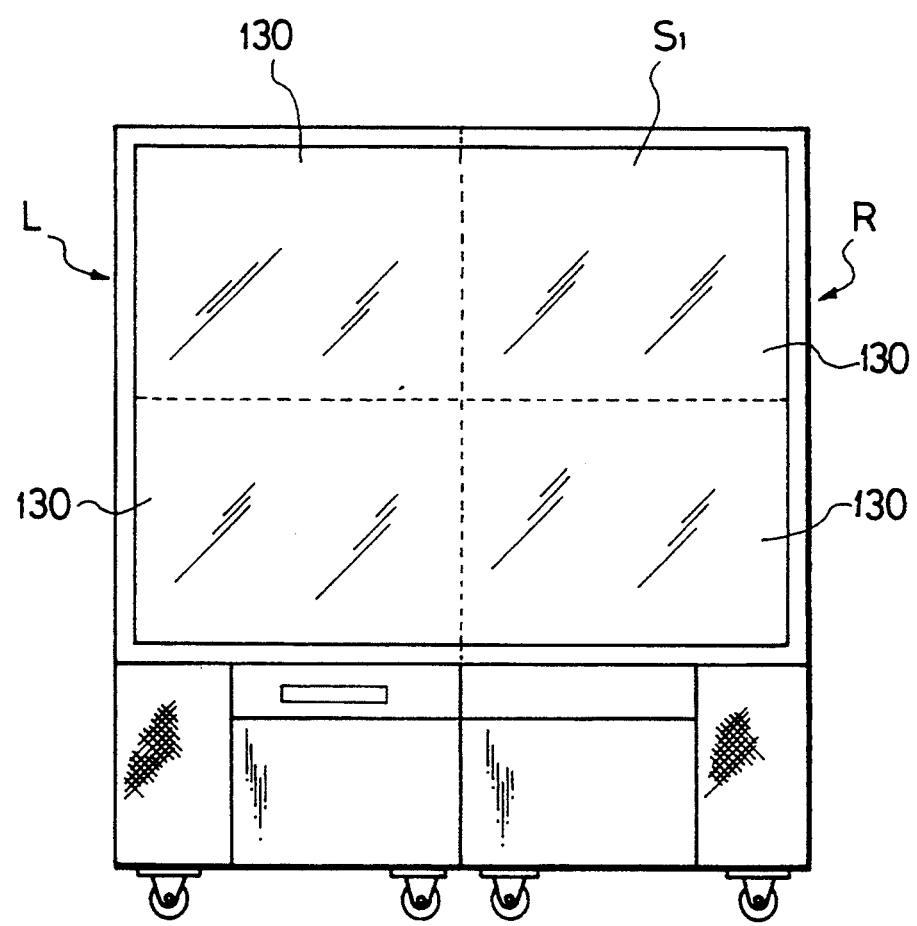

F I G. 12
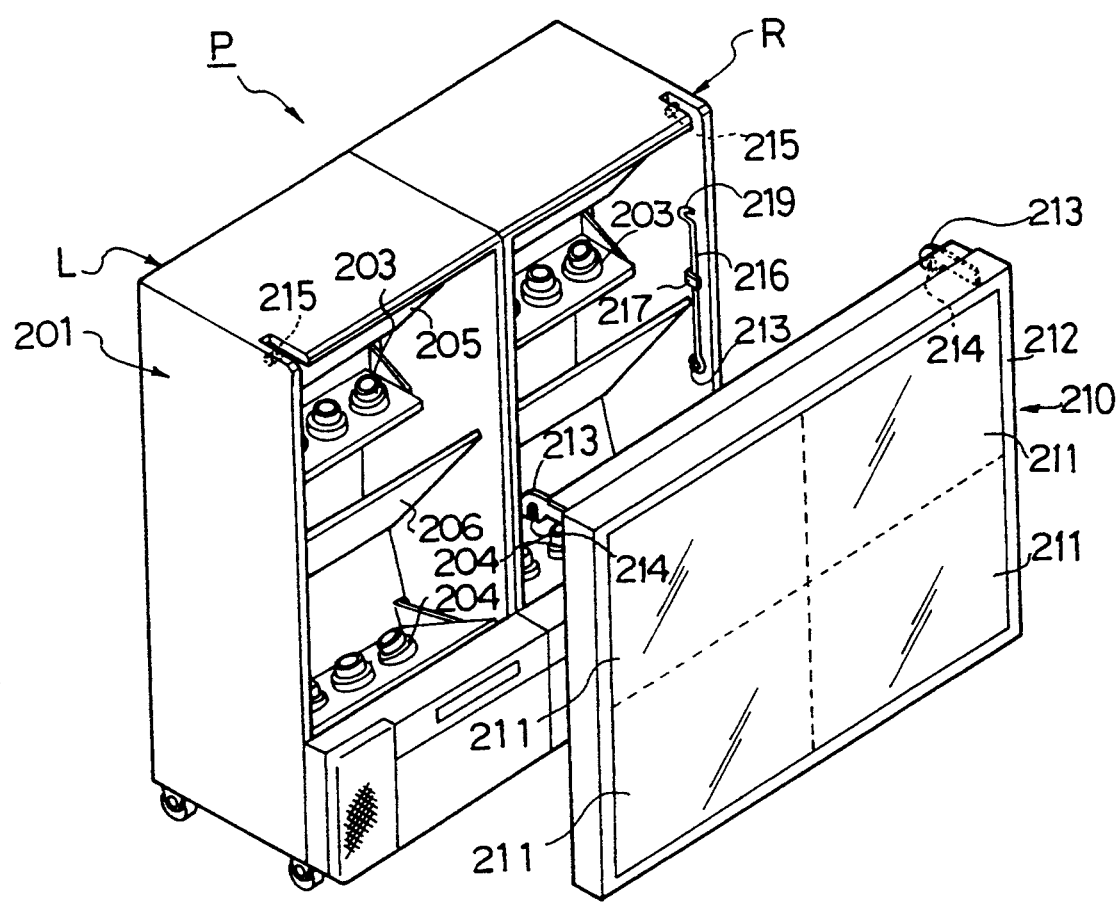

PROJECTION TELEVISION SET

BACKGROUND OF THE INVENTION

The present invention relates to a large size projection television set in which projection light rays from CRT units are focused on a screen. The present invention also relates to a large size projection television set in which projection light rays from projectors such as CRT units are focused on a screen by reflecting the light rays at reflectors. The present invention also relates to a projection television set provided at a front face of a body casing with a screen assembly having a coupling means.

Recently, a large size projection television set has been proposed in which a plurality of CRT units are arranged up and down and right and left and projection light rays from the respective CRT units are focused on a screen.

More specifically, as shown in FIG. 1, the conventional projection television set $P_0$ has an integrally formed body casing 50, and a large size screen $S_0$ is provided at a front face of the body casing.

For instance, such a large size projection television set is very large to be 1 m 80 cm wide (W), 2 m high (H) and 75 cm deep (D). In particular, if its width exceeds 1 m 80 cm, it would be impossible to load it into a regular elevator when the TV set is transported to a site after the inspection of a factory. Thus, the transportation to the site is very complicated and the place where the TV set is to be laid is unduly limited. These problems would limit the sales market and its flexibility. On the other hand, in the case where the body is exploded or dismounted into a screen, CRTs, mirrors, electric components and the like which are to be transported to the setting place and to be assembled in the place, the assembling work and the adjustment work would be time-consuming. In addition, in this case, some other adjustment and measurement instruments have to be transported together, resulting in further complication in work.

In view of the foregoing shortcomings, an object of the present invention is to provide a projection television set which may readily be transported and assembled.

Recently, a large size projection television set has been proposed in which a plurality of CRT units are arranged up and down and right and left and projection light rays from the respective CRT units including projection lenses are focused on a large-size screen by reflecting the light rays by reflectors.

More specifically, as shown in FIGS. 2 and 3, the conventional projection television set $P_0$ has a casing 50 with a rectangular cross-section. The casing 50 is partitioned into an upper unit 51 and a lower unit 52. In the upper and lower units 51 and 52, upper and lower CRT units 53 and 54 having upper and lower mirrors 55 and 56 symmetrically arranged with respect to a horizontal line 1 are located corresponding to the associated mirrors 55 and 56, respectively. The upper CRT unit 53 is disposed within an upper reception space 60 in the vicinity of an upper end of a screen $S_0$ provided at a front face of the casing 50, whereas the lower CRT unit 54 is disposed at a position in the vicinity of a lower edge of the screen $S_O$ of the lower unit 52.

However, in the case where the upper CRT unit 53 and the lower CRT unit 54 as well as the associated upper and lower mirrors 55 and 56 are thus arranged, assuming that a size of the screen be of 80 inches, the depth W is reduced to, for example, 620 mm but the height H of the casing 50 would reach, for example, 2,350 mm since the upper CRT unit 53 is disposed in the upper reception space 60. If the height thereof would be extremely increased, in the case where the projection television set $P_0$ is installed within a building, not only would it be physically impossible to install the television set in an omnifarious building having an average interior height of 2.2 m up to the ceiling but also it would be impossible to load the television set into an elevator for installation thereof into the building. The transportation of the television set is also inconvenient.

Accordingly, in view of the above-noted defects, an object of the present invention is also to provide a projection television set which has a relatively low height in spite of a large size screen and which may be conveniently transportated.

On the other hand, in general, in projection television sets, CRT units, LCD units and the like are provided in a body casing, and a screen assembly which is formed by combining a lenticular sheet and a Fresnel lens is mounted on a front face of the body casing. The screen assembly is of a type in which the screen assembly may be inserted in the front face of the body casing at the site. The screen assembly may be removed away from the body casing for cleaning the interior of the body casing or for adjusting a focus of lenses of the CRT units.

However, the recent projection television sets have been enlarged. When their sizes of the screens are of about 50 inches, the weights thereof would not seriously cause problems. Nevertheless, when the projection television sets use large screens of 80 inches, the weights would reach 50 kg, and it would be difficult for one worker to remove the screen assemblies from the body casings for cleaning reflector mirrors, screens and the like. This would be inconvenient. Also, in the case where the screen assembly is transported separately, it is time-consuming to mount the screen assembly in place by using screws.

In view of the foregoing defects, an object of the invention is to provide a projection television set in which a body casing interior may readily be opened upon the cleaning operation, the lens focus adjustment and other maintenance operation after the installation of the television set and in which it is easy to carry out various operations.

SUMMARY OF THE INVENTION

According to a first aspect of the invention there is provided a projection television set comprising a body composed of at least two divided units, a screen assembly having an integrally formed screen corresponding to the body, and a coupling means for coupling the divided units together and the screen assembly.

Upon the transportion, the TV set is delivered while being divided into the screen assembly and respective body units and at the setting place, the respective units are coupled with each other by the coupling means. If, thus, the screen assembly and the respective divided units are separately delivered and these components are assembled by the coupling means, then the transportion and assembling works may readily be carried out as well as the adjustment work.

According to another aspect of the present invention, there is provided a projection television set comprising at least two upper and lower units arranged up and down, each of the upper and lower units having a projector for emitting light rays for forming an image on a screen and a reflector for reflecting the light rays from the projector onto the screen. The projector of the lower unit is arranged below the reflector of the lower unit, and the projector of the upper unit is arranged in an intermediate position between the reflector of the upper unit and the reflector of the lower unit so that setting angles of the two reflectors are different from each other.

The setting angles of the two reflectors are different from each other. The projector of the lower unit is disposed below the reflector of the lower unit. The projector of the upper unit is interposed between the reflector of the upper unit and the reflector of the lower unit. If the upper unit is thus interposed between the reflectors of the upper and lower units, it is possible to dispense with an upper space for the upper unit.

According to still another aspect of the present invention, there is provided a projection television set in which a screen assembly is mounted on a front face of a body casing provided with a projector portion in its interior, the projection television set being characterized in that a hook member is mounted on a frame of the screen assembly, a hook receiving member is mounted on the body casing, and the screen assembly is supported by the hook receiving member and freely rotatable about the hook receiving member.

When the television set is installed at the site, the hook member is hooked at the hook receiving member at the site where the screen assembly is separately transported. The body casing interior is opened by swinging the screen assembly forwardly about a center of the hook receiving member mounted on the body casing during the focus adjustment of the lenses or the maintenance work. If desired, the opened screen assembly is fixed by using a support rod for carrying out the maintenance work. After the completion of the work, the screen assembly is rotated about the hook receiving member to the front face of the body casing, again fixed to and brought into contact with the front face of the body casing.

It is apparent for those skilled artisan that the foregoing three aspects of the invention may be combined as desired.

BRIEF DESCRIPTION OF THE DRAWINGS

In the accompanying drawings:

FIG. 10 is a frontal view showing the projection television set shown in FIG. 9;

FIG. 12 is a developed perspective view showing a projection television set according to still another embodiment of the invention;

DESCRIPTION OF THE PREFERRED EMBODIMENTS

The present invention will now be described with reference to the accompanying drawings.

Figure 1:
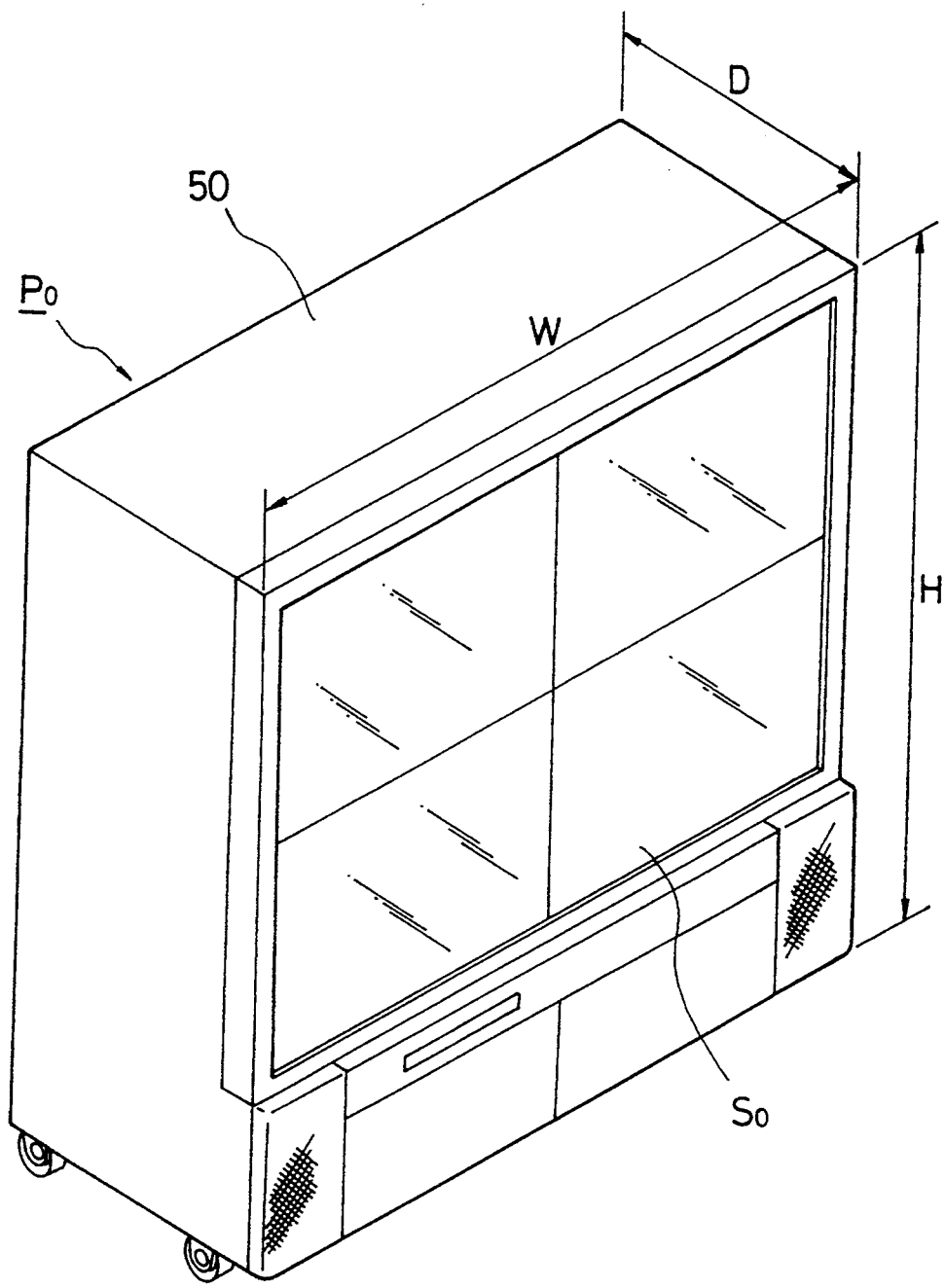
FIG. 1 is a perspective view showing a conventional projection television set.
Figure 2:
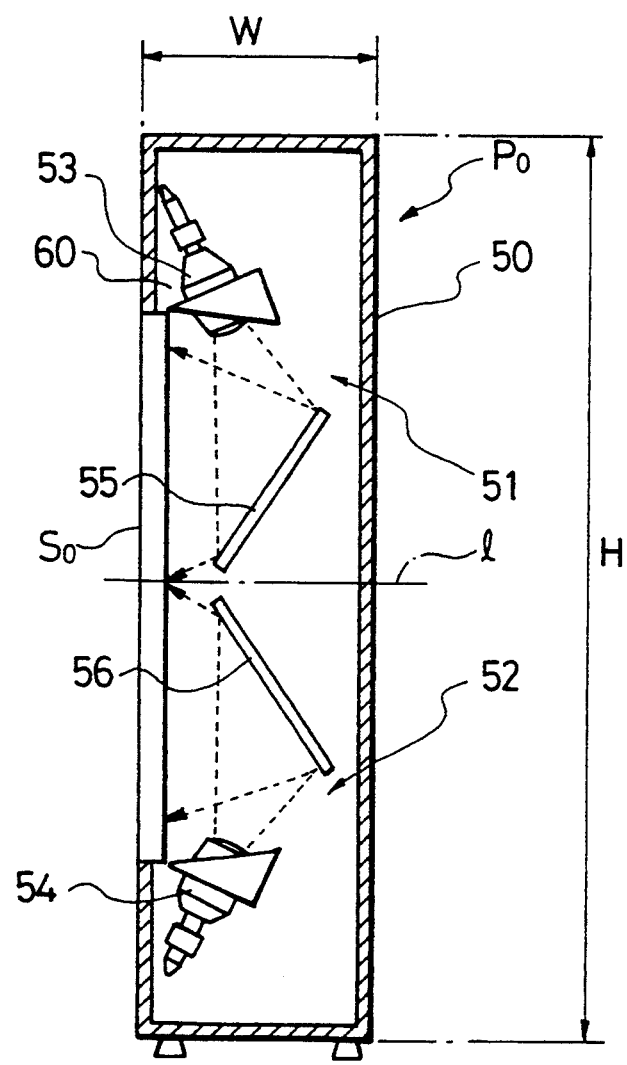
FIG. 2 is a side elevational cross-sectional view showing an internal part of another conventional projection television set.
Figure 3:
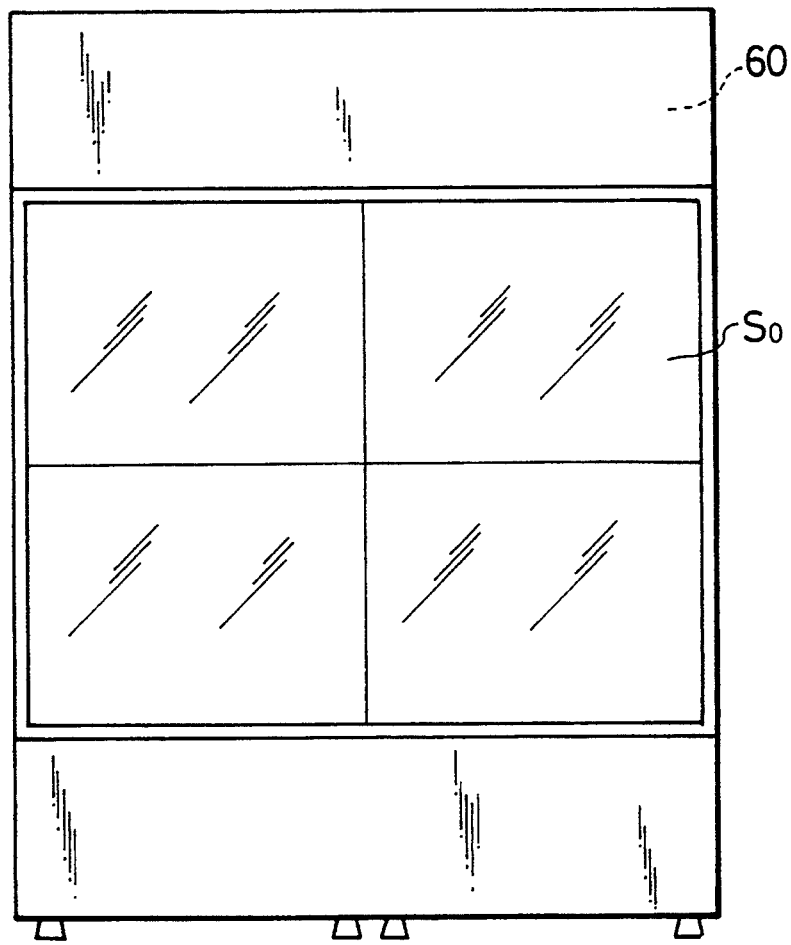
FIG. 3 is a frontal view showing the conventional projection television set shown in FIG. 2.
Figure 4:
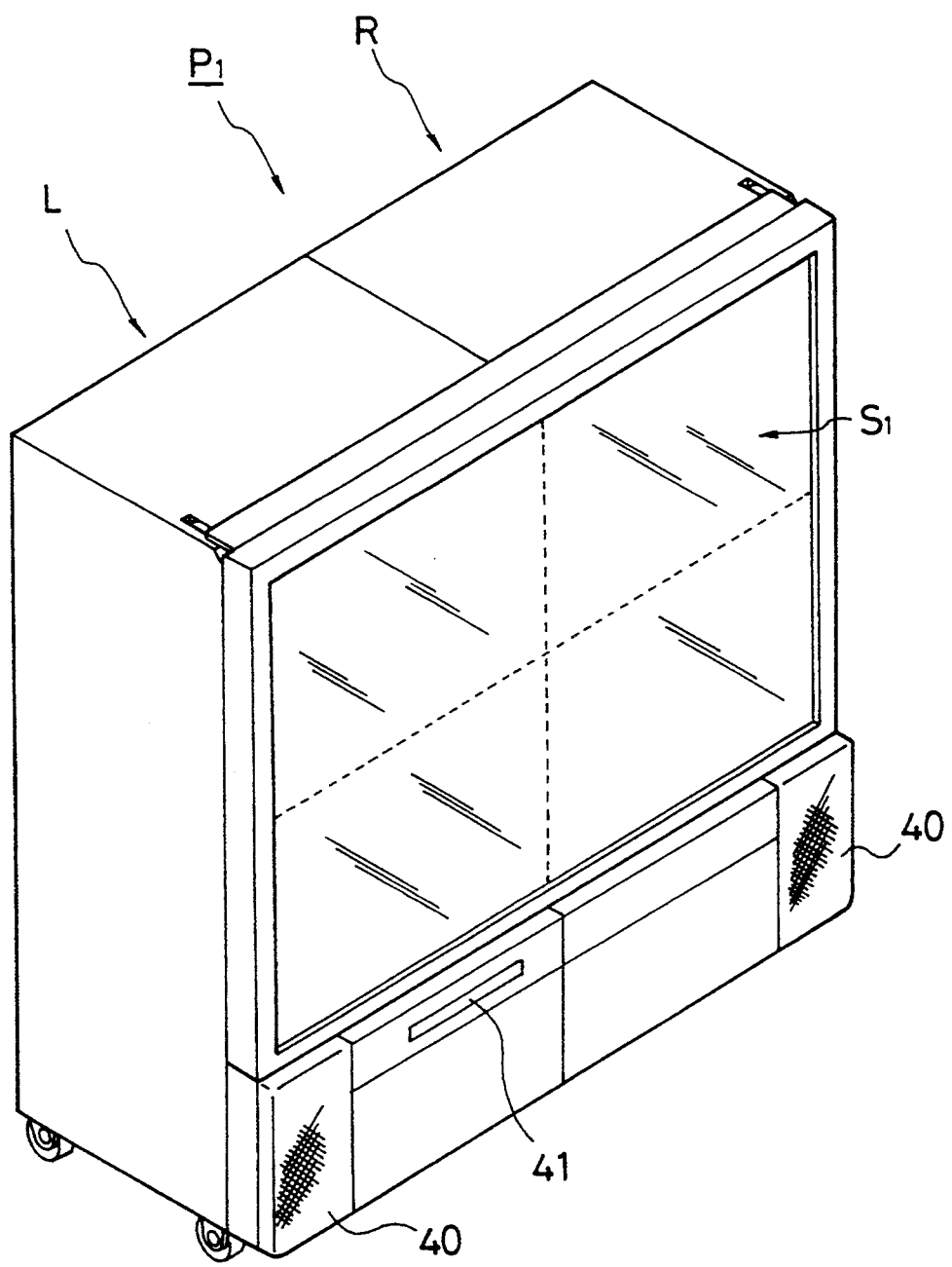
FIG. 4 is a perspective view showing a projection television set according to a first embodiment of the invention.
Figure 5:
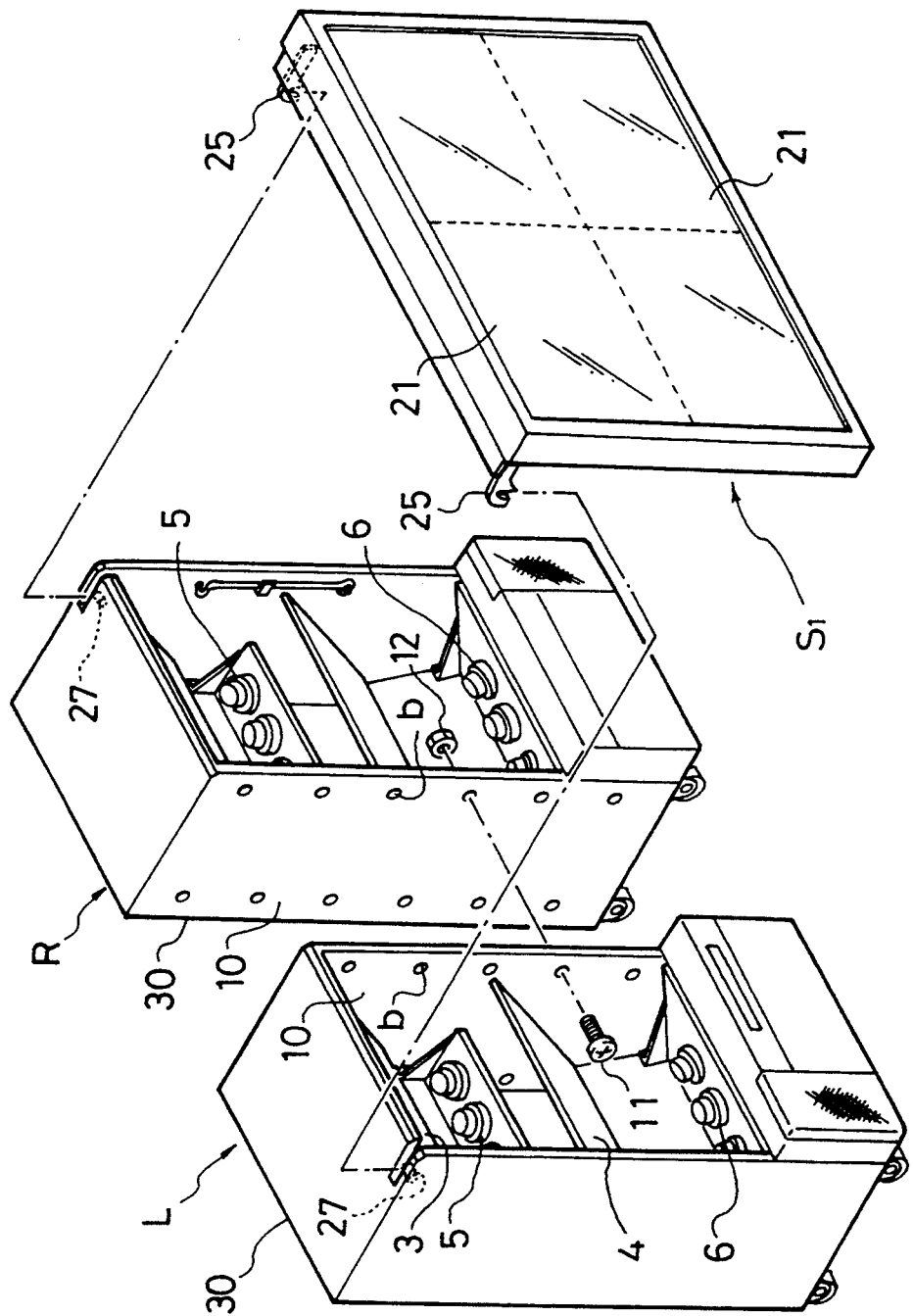
FIG. 5 is an exploded perspective view showing the projection television set shown in FIG. 4.
Figure 6:
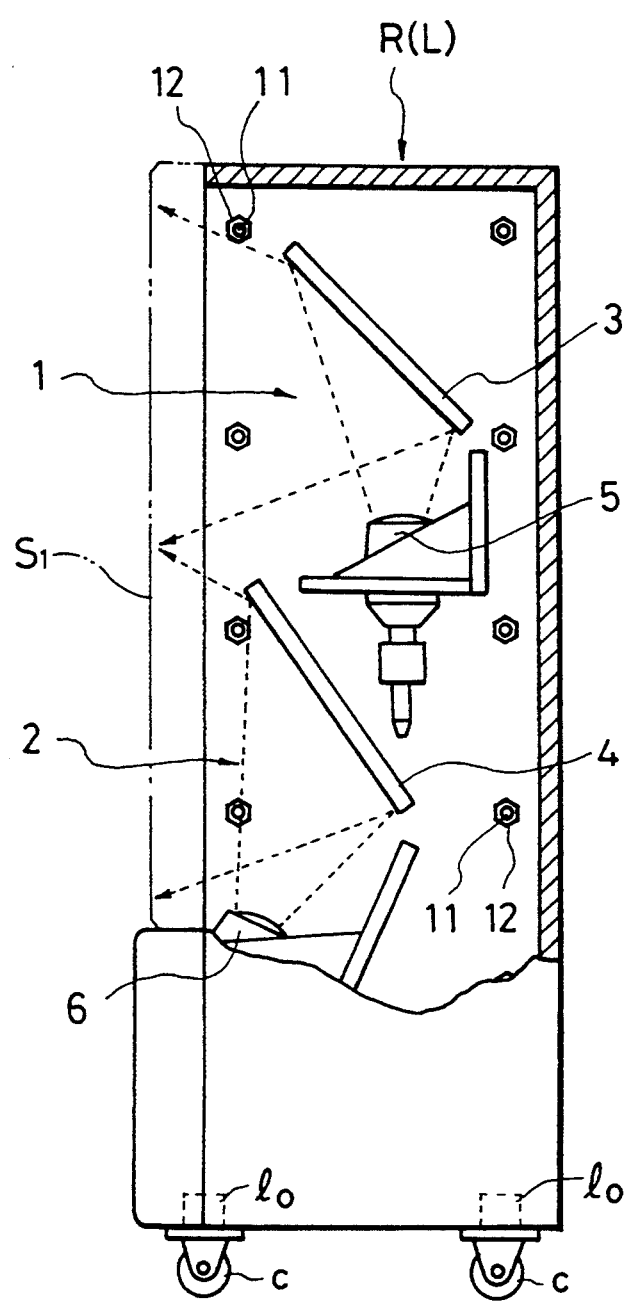
FIG. 6 is a side elevational cross-sectional view showing the projection television set shown in FIG. 4.

In FIGS. 4 to 6, a projection television set $P_1$ according to the present invention is composed of a left divided unit L and a right divided unit R. A screen assembly $S_1$ is provided on a front face of an assembly composed of these two divided units L and R. Speaker units 40 and a control section 41 are provided below the screen assembly $S_1$. The left speaker 40 is disposed on the left side of the left unit L and the right speaker 40 is disposed on the right side of the right unit R. Each of the divided units L and R has a parallelepiped casing 30 which is internally divided into an upper unit 1 and a lower unit 2. Reflex mirrors 3 and 4 are provided in the upper and lower units 1 and 2, respectively. CRT units 5 and 6 for R, G and B are arranged as projectors corresponding to the reflex mirrors 3 and 4, respectively. The projector has a projecting lens.

A suitable number of bolt holes b, b, ..., b are formed in a coupling side walls 10 of the right and left divided units R and L. Bolts 11 will be inserted into the bolt holes b. Nuts 12 are driven to detachably couple the right and left respective divided units. The above-mentioned bolt holes b, bolts 11 and nuts 12 mainly constitute the coupling means for each divided unit.

In one of the units L and R, an electric process circuit for the CRT units 5 and 6 is assembled. The electric process circuit includes a deflection drive circuit, a high voltage circuit, etc.

Figure 7:
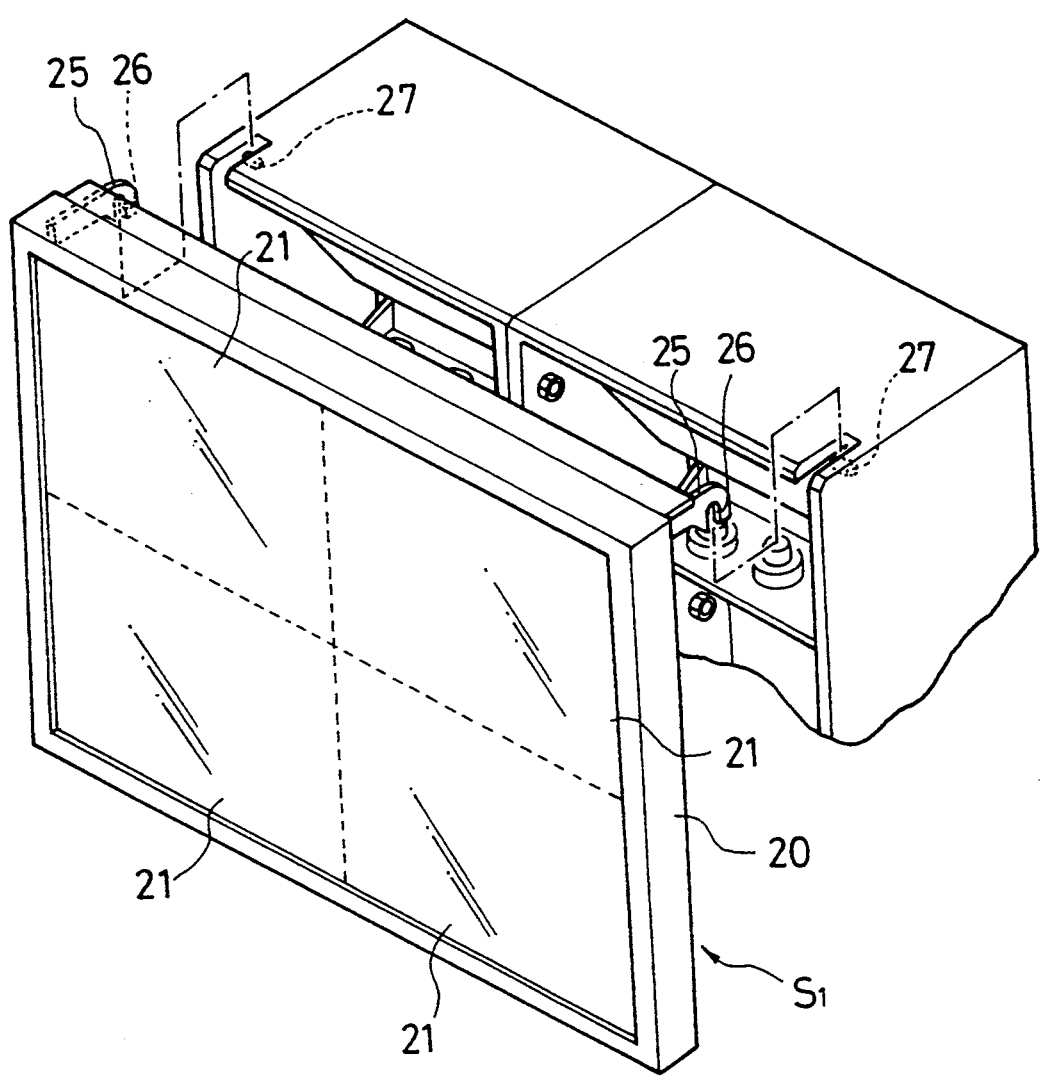
FIG. 7 is an exploded perspective view showing the front face of the projection television shown in FIG. 4.

The aforesaid integrally formed screen assembly $S_1$ is formed of four unity screens 21, 21, ..., 21 joined together. The screen assembly $S_1$ is retained by a rectangular frame 20 (see FIG. 7). Hook devices 25 are provided at right and left portions of an upper side of the frame 20. Hook recesses 26 are formed in the hook devices 25. The hook recesses 26 are engaged with hook pins 27 formed at the side walls of the right and left divided units R and L whereby the screen assembly $S_1$ is operably held on the front face of the respective divided units about the hook pins 27. The hook devices 25, the hook pins 27 and the like may constitute the coupling means for the screen assembly $S_1$.

If, thus, the TV set is transported by dividing it into the three components, i.e., the right and left divided units R and L and the thin screen assembly, not only may the transportion readily be carried out, but also the respective divided units R and L and the screen assembly $S_1$ may readily be assembled together through the respective coupling means.

Figure 8:
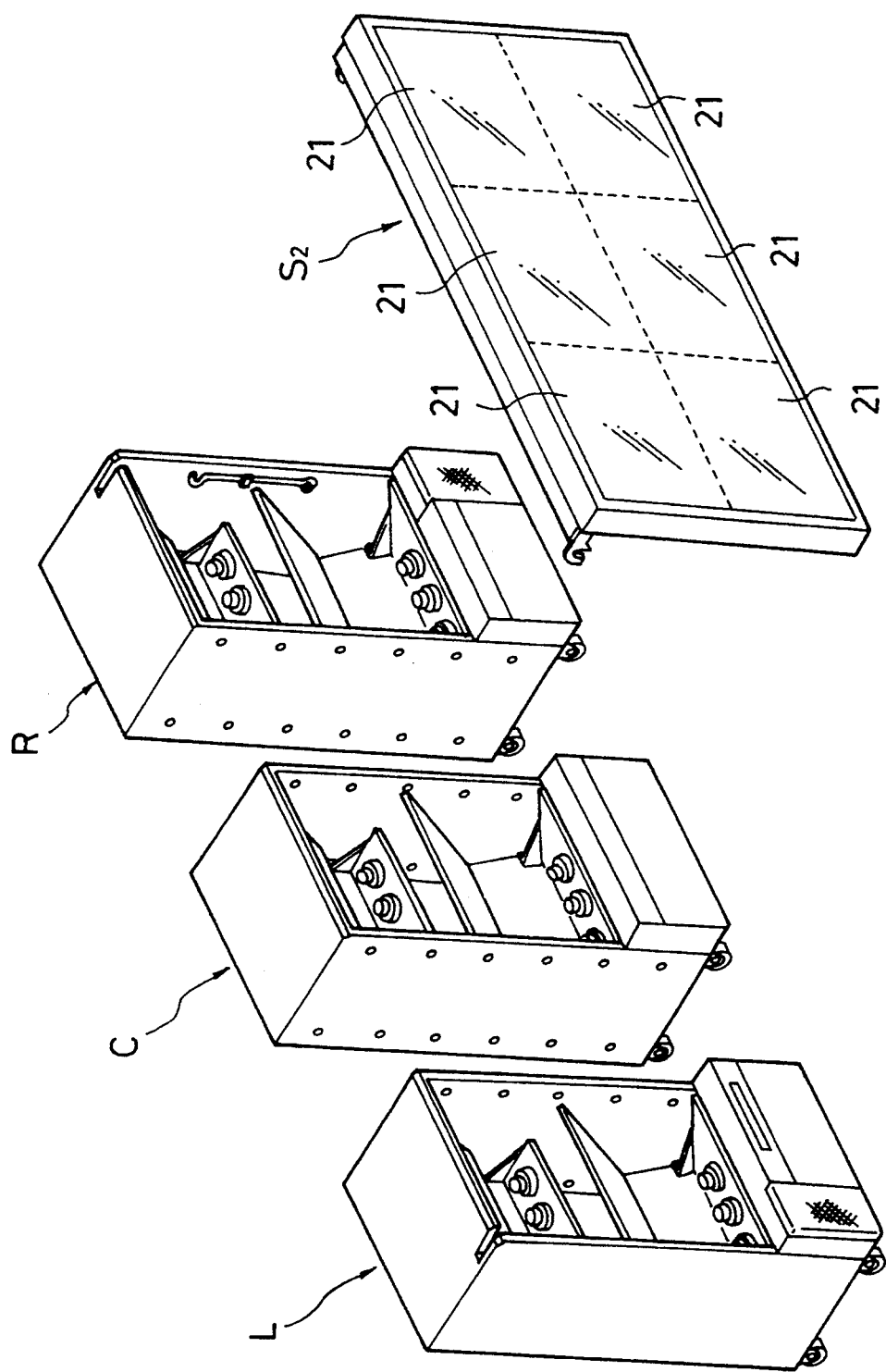
FIG. 8 is an exploded perspective view showing another embodiment of the invention.

In the foregoing embodiment, the body casing is divided into the right and left divided units R and L. However, as shown in FIG. 8, two or more divided units may be used; that is, a centrally divided unit C may be provided in addition to the right and left divided units R and L. The screen assembly S2 may be formed into one piece corresponding to the respective divided units. In this case, the screen S2 may be formed of six unity screens 21, 21, ..., 21. Thus, if the number of the divided units is increased, it is possible to readily expand the TV set in a horizontal direction.

Incidentally, an area of entrance of an elevator for people is 207 to 210 cm high (H), and 89 to 90 cm wide (W) (for 13 to 15 people), and its internal size is 230 cm high (H), 159 cm wide (W) and 134 to 140 cm deep (D). Accordingly, the divided units and the screen assembly in accordance with the invention may readily be transported. Even if the elevator is very big to accommodate the assembled television set $P_1$, the assembled television set $P_1$ is heavy and according the set $P_1$ must be divided into some divided units.

Casters c are provided on bottom surfaces of the divided units to thereby enable a free transportation. In addition, if levelers $l_0$ are mounted on the bottom surfaces of the units, a height adjustment can be performed freely irrespective of a level of floor. Incidentally, connectors for electric connection for the divided units are provided to thereby carry out a brightness adjustment and a convergent adjustment.

The foregoing embodiments are related to the CRT units as the projectors but needless to say, it is possible to apply the present invention to an example of LCD units and/or a single projection lens.

According to the present invention, since the body casing is divided into a plurality of divided units and the screen assembly is of a type attachable to the body casing, it is possible to overcome a problem such that the TV set could not be entered into the elevator during the transportion. The transportation work may readily be attained and the assembling work may readily be carried out even at the setting place by the coupling means. Therefore, the focus adjustment, the convergent adjustment and the like may readily be performed, and additionally, the expansion in the lateral or horizontal direction may readily be carried out, advantageously.

Another embodiment of the present invention will now be described with reference to FIGS. 9 to 11.

Figure 9:
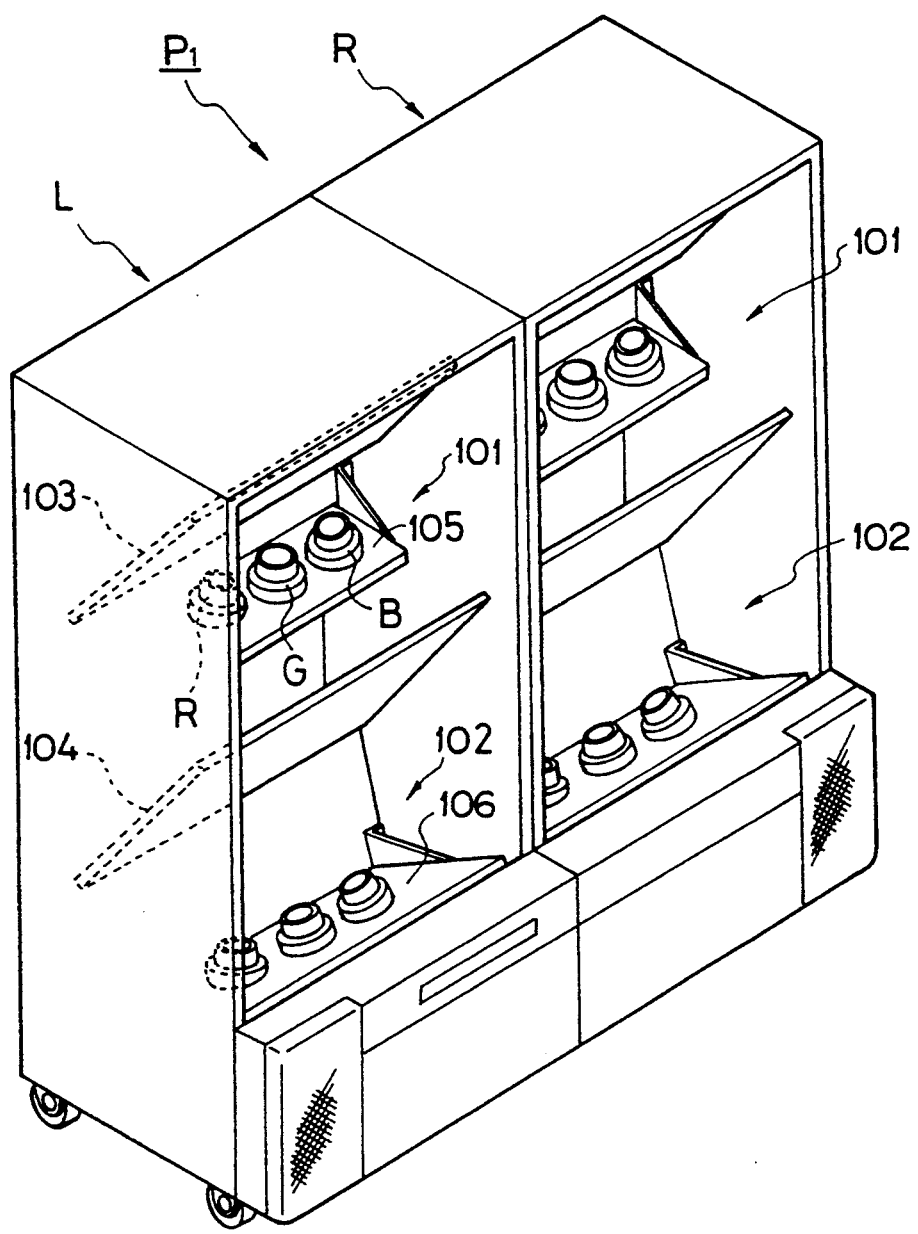
FIG. 9 is a perspective view showing an internal structure of a projection television set according to the invention.

In FIGS. 9 and 10, a projection television set $P_1$ is composed of a left unit L and a right unit R. The two units L and R may be separated from each other for transportation. A screen $S_1$ is provided at a front face of the combined two units L and R. The screen $S_1$ is composed of four rectangular unity screens 130 each of which is formed by overlapping a lenticular sheet and a circular Fresnel lens on each other with a center of the Fresnel lens being disposed at a center of the unity screen. A single Fresnel lens for the screen $S_1$ is formed by bonding four Fresnel lenses for the four unity screens with each other, and a single lenticular lens for the screen $S_1$ is formed by bonding, with each other, two lenticular lenses each for the left or right unit L or R.

The two units L and R are each composed of an upper unit 101 and a lower unit 102. The upper and lower units 101 and 102 are provided with an upper CRT unit 105 and a lower CRT unit 106 each composed of three R, G and B CRT units. Reflector mirrors 103 and 104 as reflectors are arranged at positions corresponding to the CRT units 105 and 106. The light rays projected from the respective CRT units 105 and 106 are reflected at the reflector mirrors 103 and 104 to form an image on the screen $S_1$.

Figure 11:
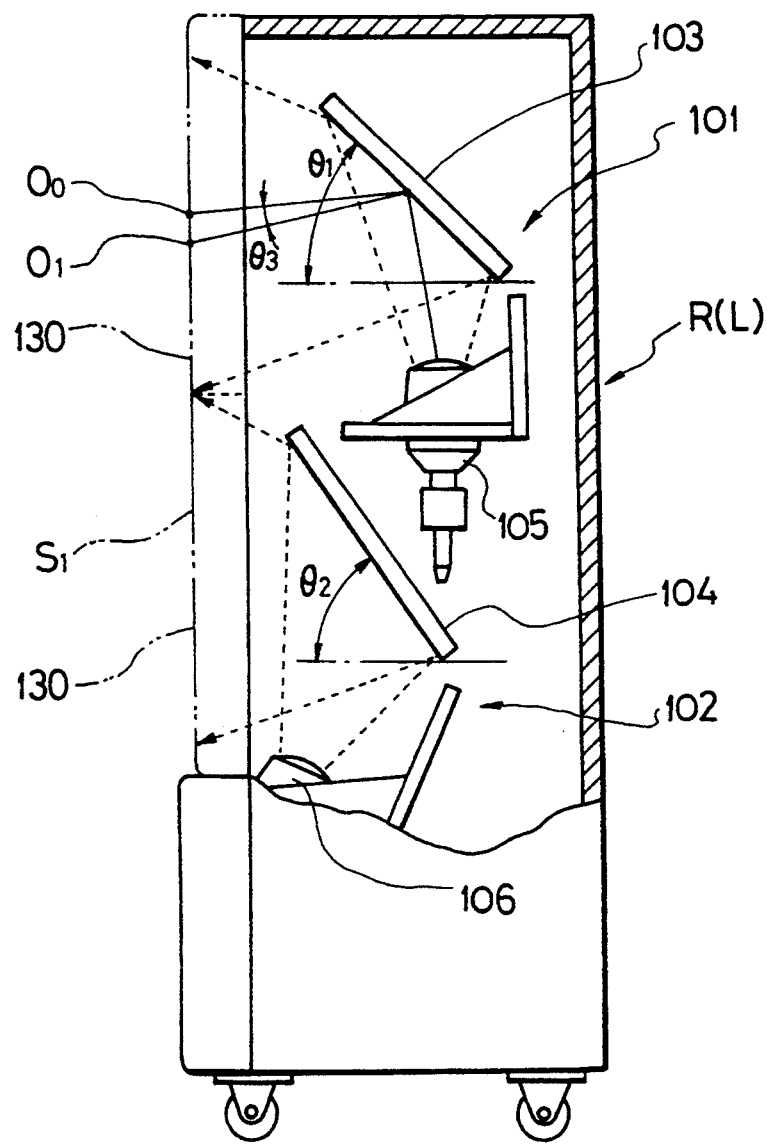
FIG. 11 is a side elevational view showing an internal part of the projection television set shown in FIG. 9.

In FIG. 11, the upper mirror 103 is arranged at a setting angle $\theta 1$ (theta) with respect to a horizontal plane. The lower mirror 104 is arranged at a setting angle $\theta 2$ (theta) with respect to the horizontal plane and is greater than the setting angle $\theta 1$ (theta) of the upper mirror 103. The lower CRT 106 of the lower unit 102 is disposed in the vicinity of the lower edge of the screen $S_1$, whereas the upper CRT unit 105 is interposed in an intermediate position between the upper mirror 103 and the lower mirror 104. The center $O_1$ of the Fresnel lens of the unity screen 130 corresponding to the upper unit 101 is positioned eccentrically downwardly from the proper or inherent center $O_0$ thereof by an eccentric angle $\theta 3$ (theta) of approximately 3 degrees. In other words, the light rays which are eccentrically displaced or offset downwardly by 3 degrees from the light rays passing through the proper center $O_0$ from the upper CRT unit will pass through the actual center $O_1$. In case of an 80-inch television set, a distance between the centers $O_0$ and $O_1$ is about 40 mm. If, thus, the center of the unity screen of the upper unit is eccentrically displaced or offset, the range where the brightness would be kept uniform may be extended even if the observer would approach the television set.

Thus, if the upper CRT unit 105 of the upper unit 101 is interposed between the upper and lower mirrors 103 and 104, it is possible to reduce the necessary depth of the casing and to dispense with the space for receiving the CRT unit at the upper portion of the upper unit 101. Also, it is possible to reduce the physical height of the television set within 2 meters. Accordingly, it is possible to install the television set in omnifarious buildings having an average ceiling height of 2.2 meters and to readily load it into an elevator. Also, the observer can see the enlarged image as a familiar image after the installation without any unusual feeling in his or her impression from a regular television set. In the foregoing embodiment, the CRT units are used but it is apparent for those skilled in the art that the CRT unit having a single projection lens may be used, and also, LCD projector units may be used instead of the CRT units.

According to the present invention, the CRT unit of the upper unit 101 is disposed into an intermediate position between the upper and lower reflectors, whereby it is possible to reduce the height of the casing of the television set to a lower one. Thus, not only would it be possible to install the television set in a narrow building but the television set may be conveniently transported advantageously.

Still another embodiment will now be described with reference to FIGS. 12 to 14.

Figure 13:
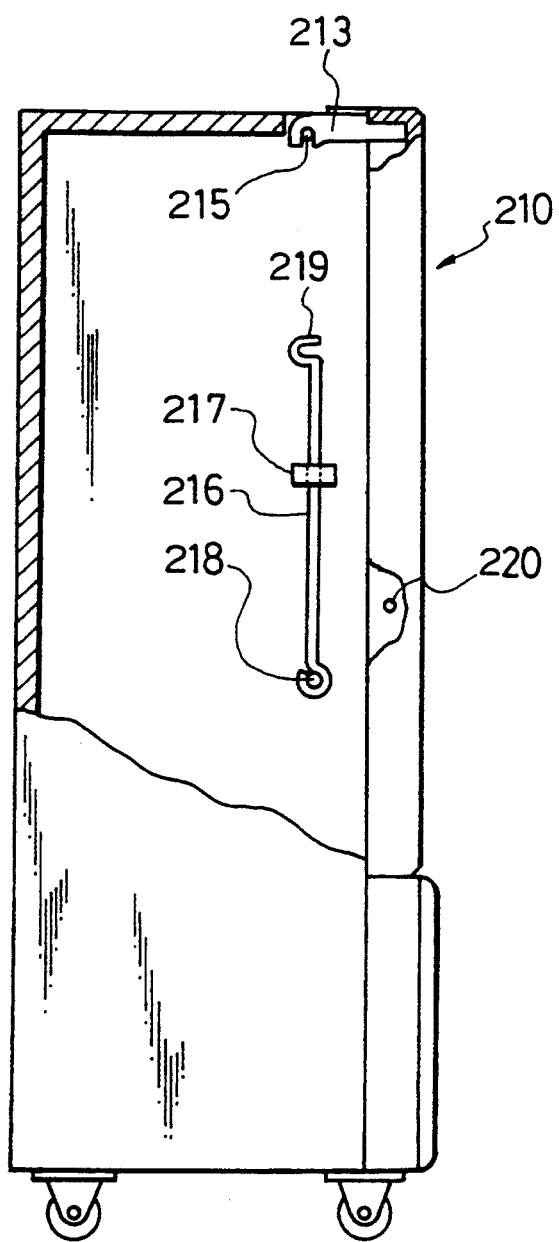
FIG. 13 is a fragmentary side elevational view showing the projection television set shown in FIG. 12.
Figure 14:
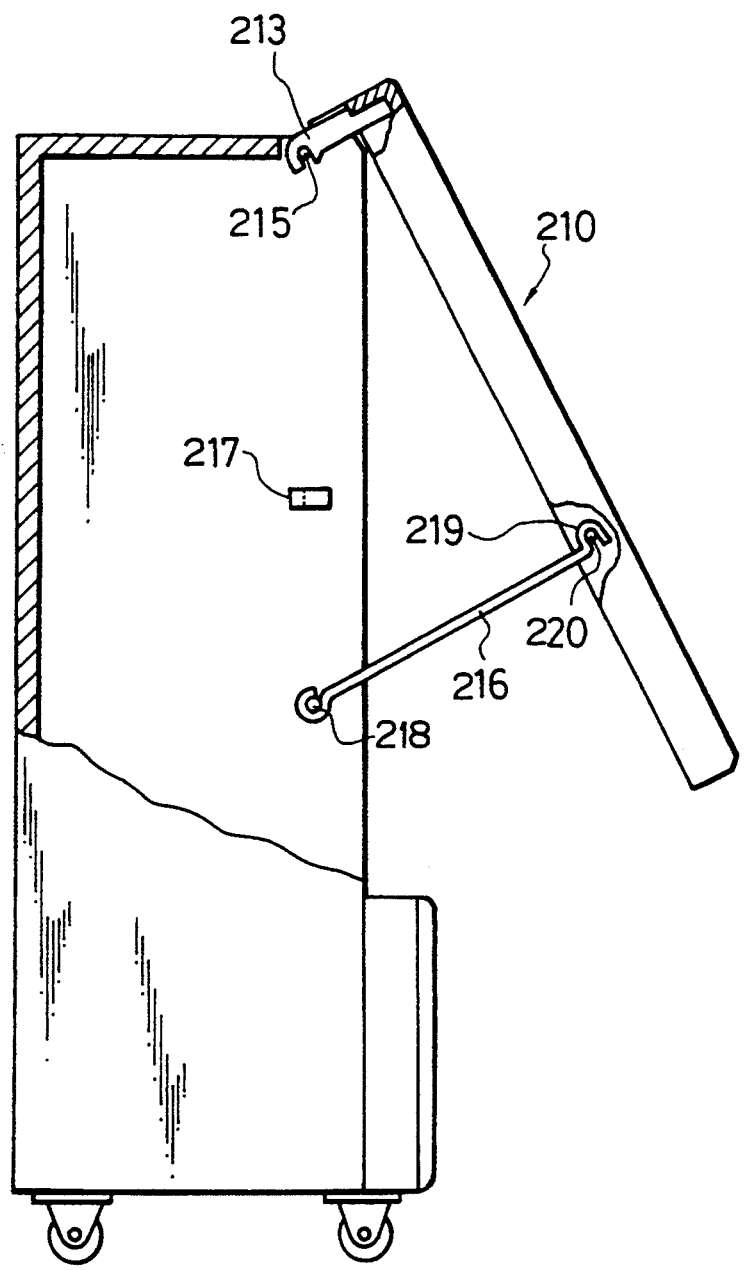
FIG. 14 is a side elevational view showing the projection television set under a state where the screen assembly is opened.

In FIGS. 12 and 13, a projection television set P according to the invention is composed of a left unit L and a right unit R. The right and left units R and L are each provided with an upper CRT unit 203, a lower CRT unit 204 and a speaker unit and an operating section at a lower front side. An upper reflector mirror 205 and a lower reflector mirror 206 are arranged corresponding to the CRT units 203 and 204. A body casing 201 is composed of casings for the two units R and L, and confronting side walls of the right and left units R and L are coupled with each other by a coupling means. A screen assembly 210 is mounted on a front face of the body casing 201. The screen assembly 210 is formed by splicing or joining unity screens 211. The joined screen is fixed within a rectangular frame 212. Each unity screen 211 is composed of a lenticular sheet and a Fresnel lens overlapped on each other. A pair of hook members 213 are mounted on right and left upper edge portions of the frame 212. A pair of hook recesses 214 are formed at lower portions of the hook members 213. The hook recesses 214 are engaged with hook receiver 215 mounted on upper inner surfaces of the side walls of the right and left units R and L.

A support rod 216 is detachably mounted on an inner surface of the side wall of one of the right and left units R and L by a clip 217. The support rod 216 is rotatably mounted at its lower end about a pin 218. A hook portion 219 is formed at an upper end of the support rod 216 so as to cooperate with a hook receiver 220 mounted on an inner surface of a vertical frame member of the frame 12 of the screen assembly 210.

The screen assembly 210 is swingably mounted in a suspension manner to the front face of the body casing 201 by means of the hook members 213 and the hook receivers 215. As shown in FIG. 14, when the screen assembly 210 is opened, the screen assembly is swung forwardly about the hook receivers 215 and the support rod 216 is engaged with the hook receiver 220 to thereby retain the screen assembly in an open position. Under this condition, the focus adjustment or the cleaning work for the reflectors and the CRT units is carried out, and then the support rod 216 is removed away from the hook receiver 220 to be returned to the original position. At the same time, the screen assembly is returned back to the position shown in FIG. 13 while being manually supported.

Figure 15:
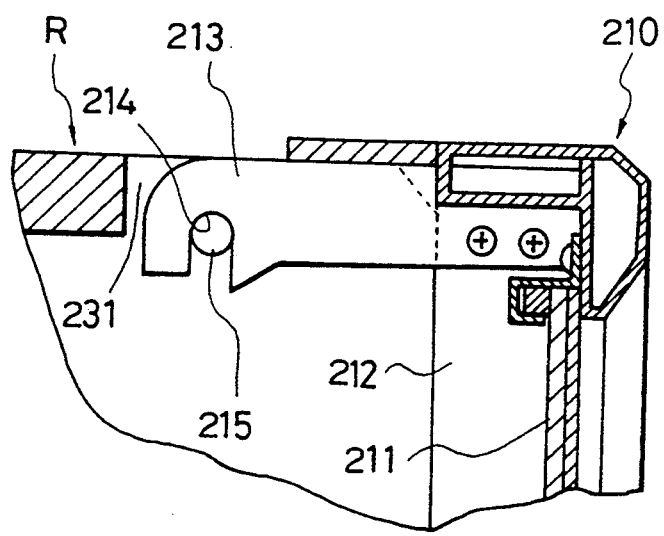
FIG. 15 is an illustration of the coupling means between the screen assembly and the body casing.
Figure 16:
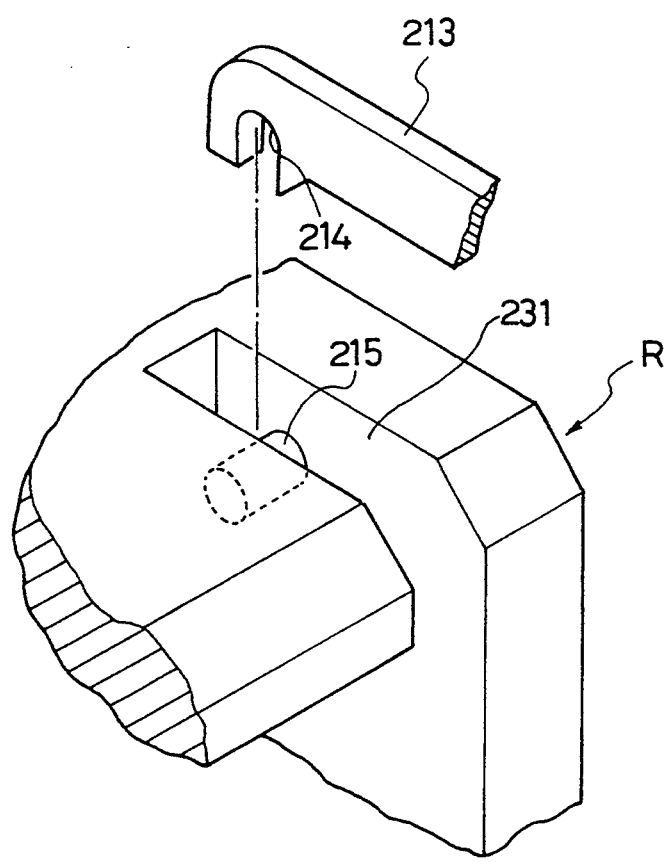
FIG. 16 is a perspective view showing the parts shown in FIG. 15.

The engagement between the hook receivers 215 and the hook members 213 is carried out as best shown in FIGS. 15 and 16. A slit 231 is formed in each end portion of the body casing 201. The hook member 213 is inserted into the slit 231. With such a structure, an upper surface of the screen assembly 210 is flush with a ceiling plate of the body casing.

If, thus, the screen assembly 210 is pivotally mounted onto the body casing 201 by the hook members 213 and the hook receivers 215, when the screen assembly 210 is to be coupled with the body casing 201, not only is the coupling operation easy but also the screen assembly can readily be removed from the front face during the maintenance work. In the foregoing embodiment, the CRT units are used but it is apparent that projector type LCD units may be used. Since the screen assembly is provided with screens, frames, light-shielding plates interposed between the screens and the like, there is no displacement thereamong and it is possible to keep good the image quality.

With such an arrangement according to the invention, it is easy to mount the screen assembly onto the body casing, to readily open the screen assembly from the front face of the body casing during the cleaning work for the mirrors and screens disposed within the body casing, and to facilitate the work to such an extent that the maintenance work may be carried out only with one person.

Also, since the screen assembly may be removed and transported, it is sufficient to take care of a possible damage of the screen or the like, which leads to simplification. Furthermore, it is possible to readily perform the replenishment or replacement of the cooling liquid for the projectors and the focus adjustment of the projection lens by opening the screen assembly.

Figure 17:
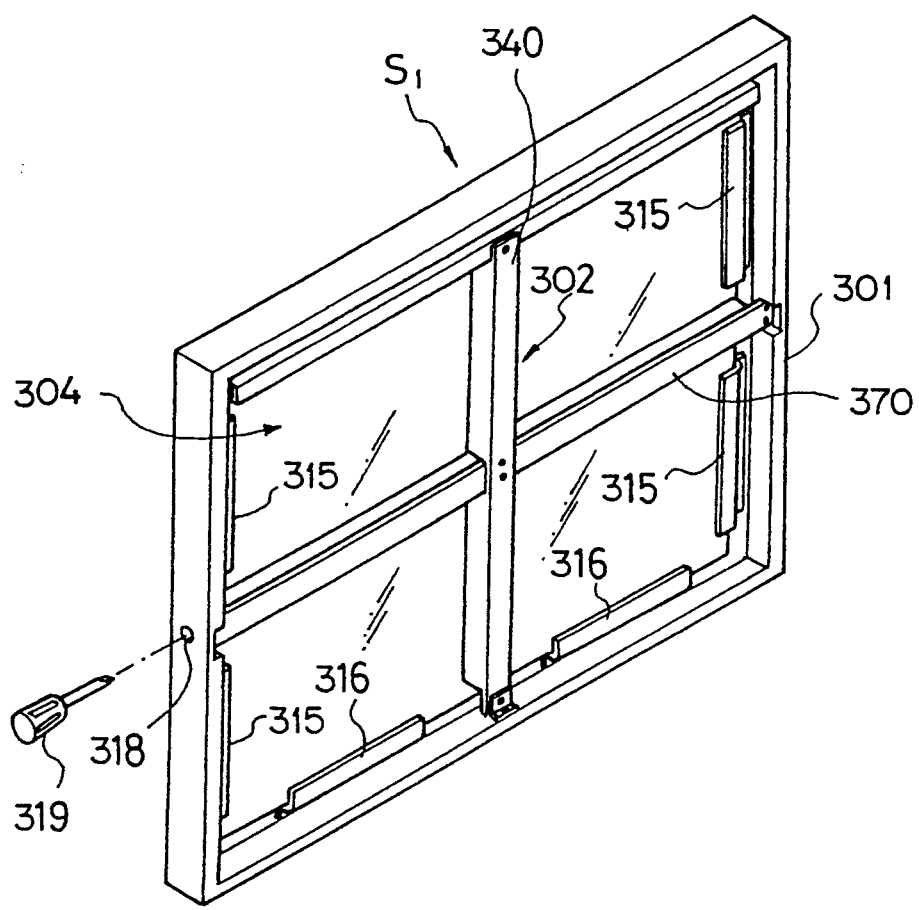
FIG. 17 is a perspective view showing a screen assembly used in the projection television set according to the invention.
Figure 18:
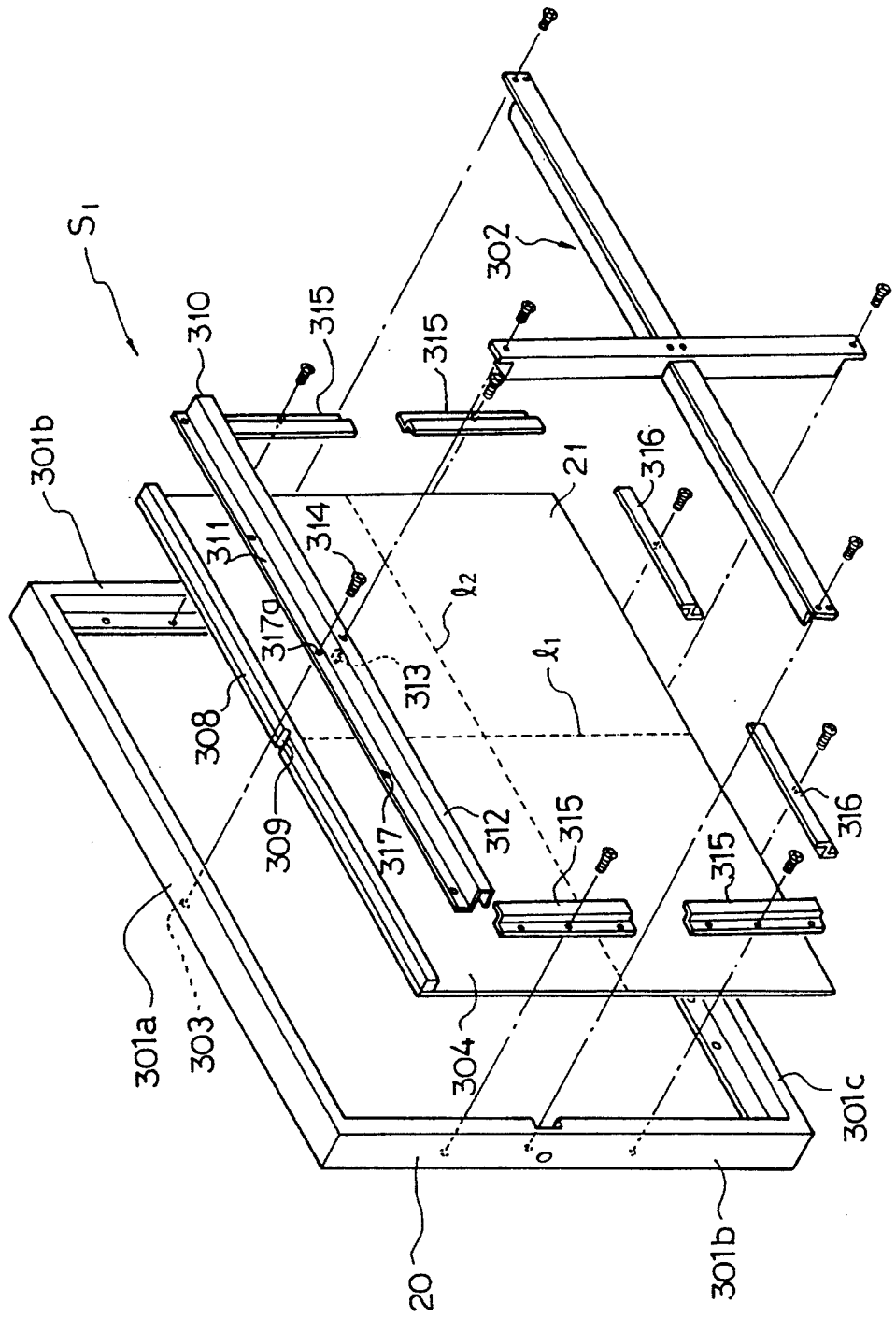
FIG. 18 is an exploded perspective view showing the screen assembly.
Figure 19:
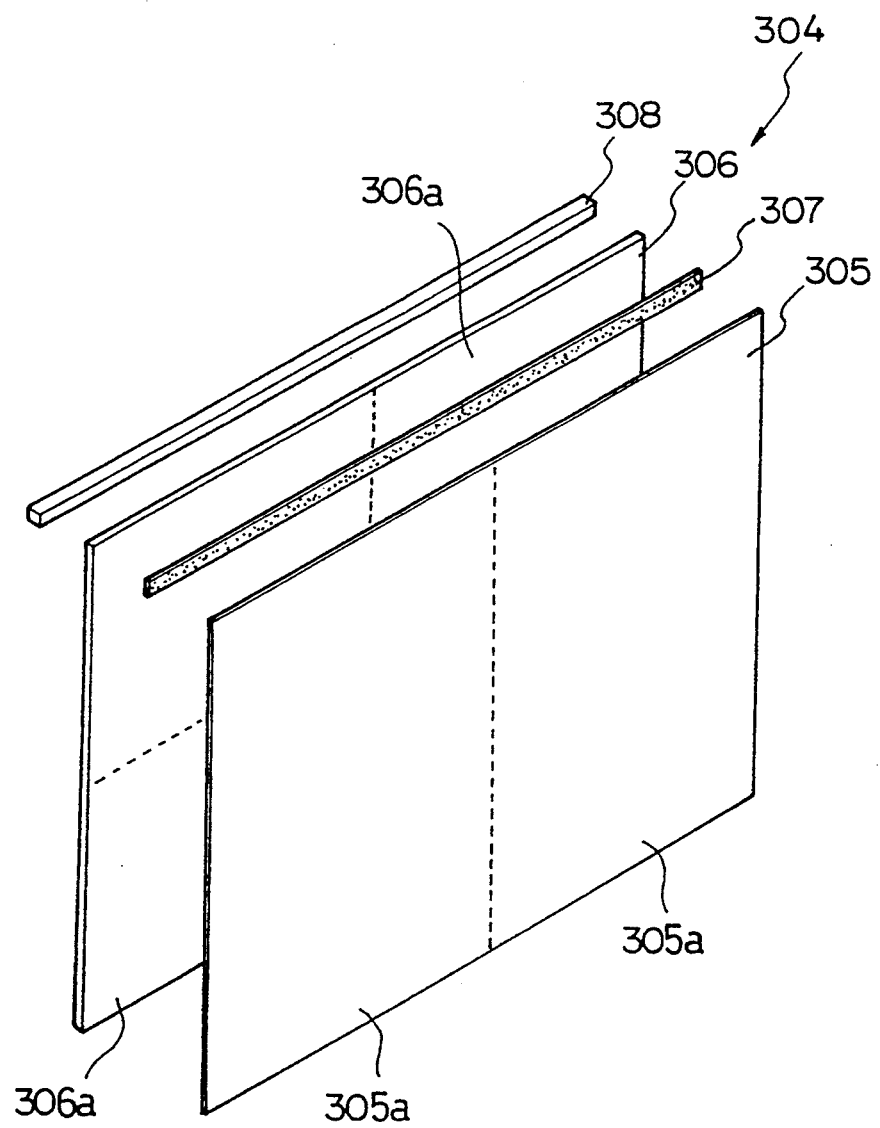
FIG. 19 is an exploded perspective view showing the screen.

The screen assembly $S_1$ is provided with a frame 301 within which suspended and supported is a screen 304 formed by bonding a joined lenticular sheet 305 formed of right and left lenticular sheet 305a, 305a through both-sided adhesive tape 307 to a joined Fresnel lens plate 306 formed of four rectangular circular Fresnel lenses 306a, 306a, . . . , 306a as shown in FIGS. 17 to 19. As shown in FIGS. 17 and 18, a cruciform black light-shield frame 302 is mounted on a rear side of the screen 304. The cruciform shield frame 302 divides the screen 304 into four sections. Four CRT units are provided corresponding to the four sections. The shield frame 302 is adapted to interrupt the upper, lower, right and left projecting light rays from the CRT units so that the projecting light rays are not intersected or overlapped with each other. If projecting light rays from another CRT unit would be projected onto an unintentional Fresnel lens, the rays would transmit a part just opposite to an intentional part, resulting in formation of a black line on the image.

As shown in FIG. 18, a positioning hole 303 is formed as a second centering section at a center in the right and left direction of an upper side 301a of the screen assembly. A support bar 308 formed by an acrylic rod is attached on an upper side of the screen 304 as a screen support member. A center recess 309 is provided at a center of the support bar 308 in its longitudinal direction. The center recess 309 as a first engagement section corresponds to a joint line $l_1$ for the right and left sections of the screen 304. On the other hand, a screen suspension plate 310 which is composed of a vertical plate 311 and a cover plate 312 formed integrally with the vertical plate 311 with a U-shaped cross section is engaged with the support bar 308. Screw holes 317, 317, . . . , 317 are formed at a predetermined interval in the vertical plate 311. Screws 314 are inserted into these screw holes and are fixed to the inner surface of the upper side 301a of the frame 301 for the screen assembly. In particular, the screw hole 317a, as a first centering section, of the above-described screw holes 317, located at the center of the vertical plate 311, is aligned with the positioning hole 303, as a second centering section, of the frame 301. A center projection 313 is formed as a second center engagement section at a center of the upper surface of the cover plate 312 and at a position corresponding to the center screw hole 317a and is engaged with the center recess 9 of the above-described support bar 308.

Figure 21:
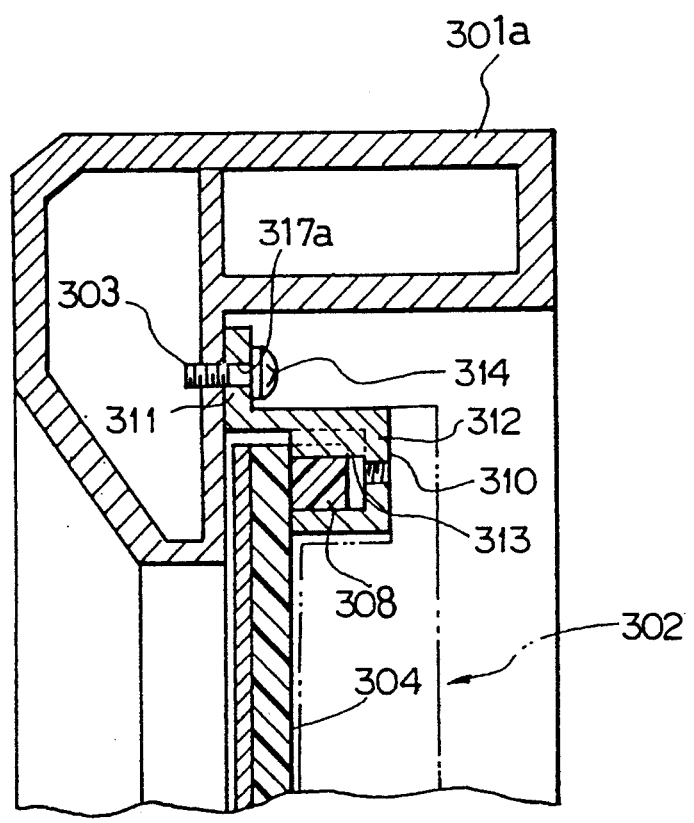
FIG. 21 is a cross-sectional view showing a fixed state of the screen to the frame.

FIG. 21 shows a mount state of the screen 304 onto the frame 301. The projection 313 of the screen suspension plate 310 is engaged with the center recess 309 of the support bar 308 so that the relative position between the support bar 308 and the screen suspension plate 310 is determined. At the same time, the center screw hole 317a is aligned with the positioning hole 303 of the upper side 301a of the frame 301 by the screw 314 so that a relative position between the screen suspension plate 310 and the frame 301 is determined. Thus, the right and left joint line $l_1$ is positioned at a position corresponding to the positioning hole 303 of the frame 301.

Referring again to FIG. 18, planar vertical screen retainers 315, 315, ..., 315 are fixed to inner surfaces of side plates 301b, 301b of the frame 301. Also, horizontal screen retainers 316, 316 are provided on both right and left sides of a lower side 301c of the frame 301. Both the screen retainers 315 are adapted to support the screen 304 with gaps such that, even if the lateral dimension of the screen 304 would be increased due to its temperature elevation, its expansion may be absorbed or cancelled. In the same way, the horizontal screen retainers 316 are adapted to support the support screen 304 with gaps such that they can absorb or cancel a vertical extension of the screen due to the temperature elevation (see FIG. 20).

Figure 20:
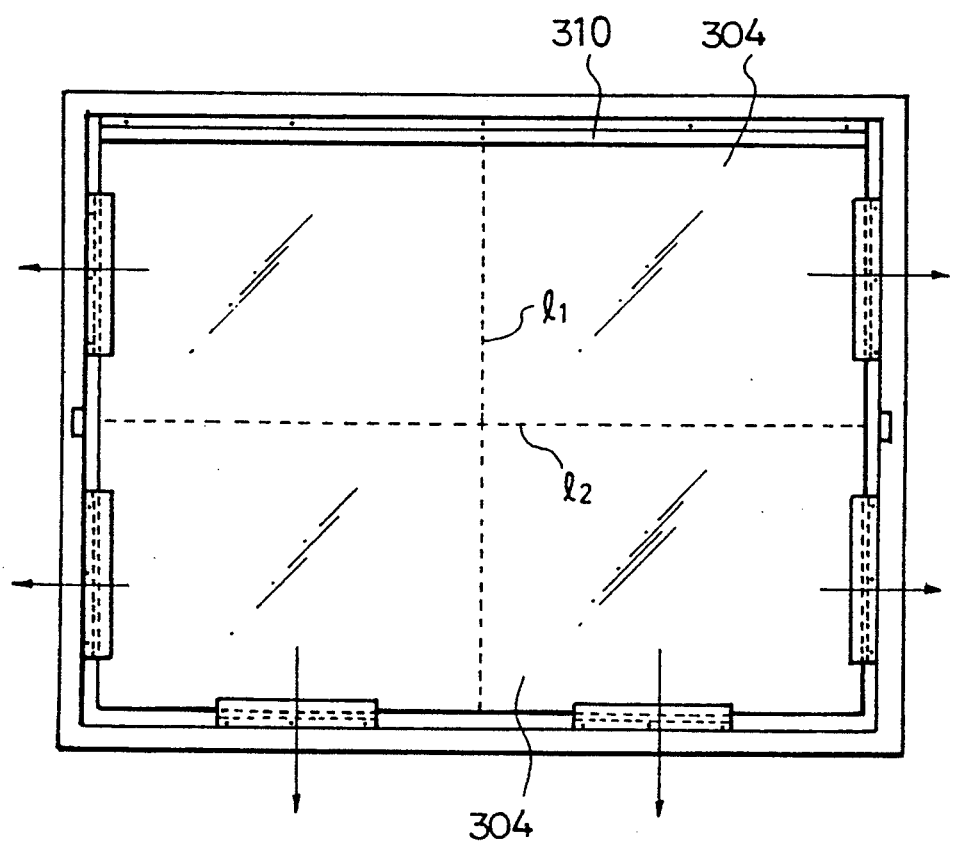
FIG. 20 is a view illustrating the expansion/retraction state of the screen.

Incidentally, although the screen 304 is expanded or contracted due to temperature change or non-uniformity of the machining precision as shown in FIG. 20, if the right and left joint line $l_1$ is aligned with the center of the frame 301 as proposed by the present invention, then the right and left center joint line $l_1$ will not move due to changes in temperature and humidity. Nevertheless, the horizontal joint line $l_2$ is subject to non-uniformity due to the machining precision for every article and is likely to move up and down due to the changes in temperature and humidity.

Figure 24:
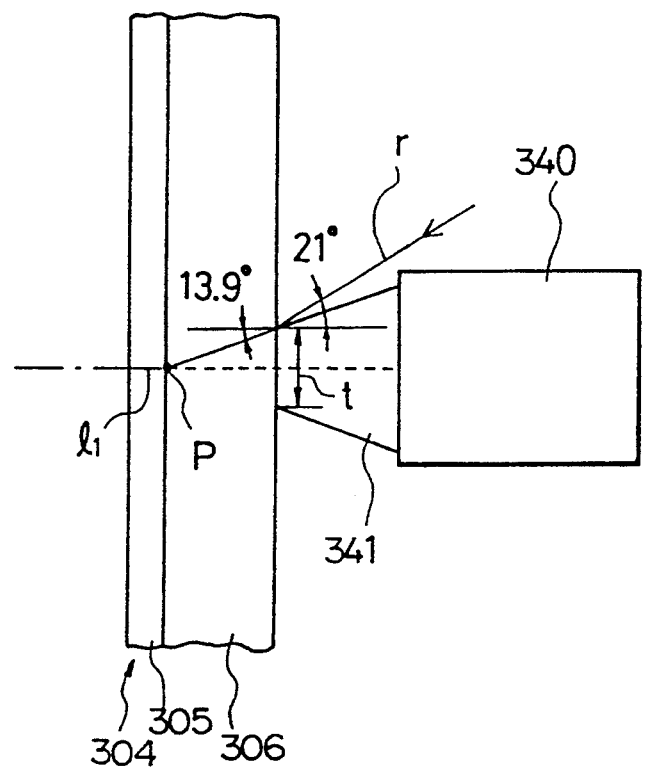
FIG. 24 is a view illustrating a theory of avoiding the image overlap.

Referring now to FIG. 24, in order to avoid the overlap of the light rays projected from the right and left CRT units, it is sufficient to interrupt the rays of light which are closer to the right and left joint line $l_1$ than a ray r reaching a point P on the right and left joint line $l_1$ and which rays pass through an interface between the lenticular sheet 5 and the Fresnel lens 306 of the screen 304. If the right and left joint line $l_1$ is centered without fail, the joint line $l_1$ will not move in the right and left direction due to the changes in temperature and humidity. Accordingly, a light-shielding member 341 is mounted on a front face of a vertical frame 340 of the light-shielding frame 302. Thus, the overlap or interference of light rays projected from the right and left CRT units is prevented. A thickness t of a tip end of the light-shielding member 341 is, for example, approximately 1.5 mm depending upon the projection angle of the CRT units, the thickness of the Fresnel lens and the like.

Figure 22:
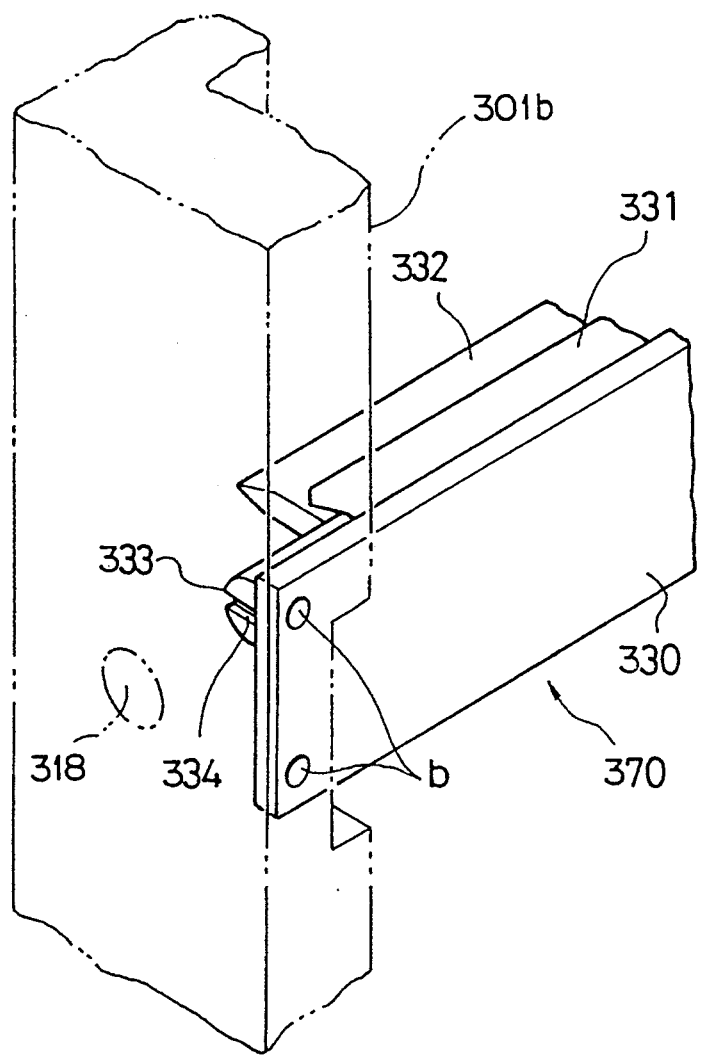
FIG. 22 is a perspective view showing a primary part of the horizontal frame.
Figure 23:
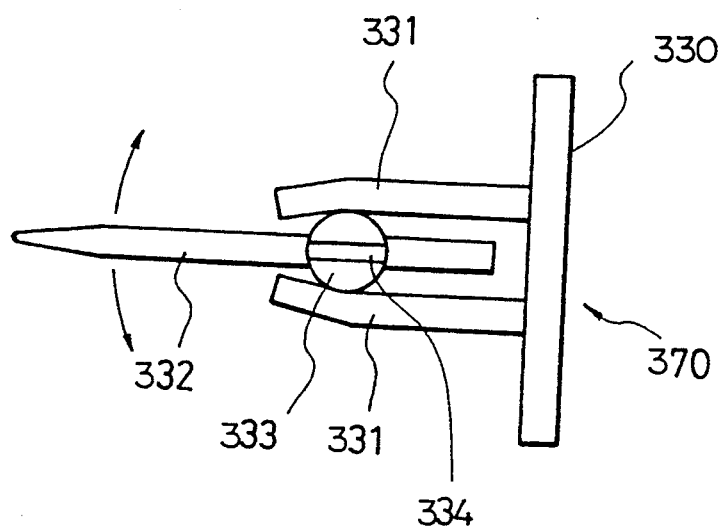
FIG. 23 is a side elevational view showing the horizontal frame.

As shown in FIG. 20, since the horizontal joint line $l_2$ of the screen 304 is displaced vertically due to the changes in temperature and humidity, it is necessary to move a light-shield plate 332 of the horizontal frame 370 in correspondence with the expansion/retraction of the screen 304 (see FIGS. 22 and 23). The horizontal frame 370 has a back plate 330. Screw holes b are formed in ends of the back plate 330. The horizontal frame 370 is fixed to side frames 301b by screws (not shown) which is engaged with the screw holes b. Elastic retainer plates 331, 331 are provided in the back plate 330 at a vertical interval. The light-shield plate 332 which is colored black for the purpose of preventing the reflection of projecting light is rotatably retained between the retainer plates 331. The light-shield plate 332 can prevent the overlap of the light rays projected from the upper and lower projectors in the same manner shown in FIG. 24. A rotary bar 333 is provided onto the light-shielding plate 332. Both ends of the rotary bar 333 extend into the side frames 301b. Grooves 334 are formed in both the end faces of the rotary bar 333. On the other hand, screw holes 318 are formed on both the side frames 301b. The rotary bar 333 is inserted into the screw holes 318. For instance, it is possible to change the position of the tip end of the light-shield plate 332 by engaging a driver 319 (see FIG. 17) with the groove 334 of the rotary bar 333 to rotate the rotary bar 333. Thus, the position of the horizontal joint line is different depending upon the machining precision for every article, and the horizontal joint line $l_2$ is moved depending upon the expansion/retraction of the screen 304. However, the position of the light-shielding plate 332 may be adjusted in response to the displacement, thereby interrupting the projection light rays from the other CRT and providing the seamless screen 304.

Although the invention has been described in its preferred form with a certain degree of particularity, obviously many changes and variations are possible therein. It is therefore to be understood that the present invention may be practiced otherwise than as specifically described therein without departing from the scope and spirit thereof.

What is claimed is:

1. A projection television set comprising:
   a body composed of right and left divided units, each unit having at least one projector and one reflex mirror for directing projection light rays from the projector to a screen;
   a screen assembly having an integrally formed screen arranged so that any seam lines of said units disappear and having a circular Fresnel lens and a lenticular sheet which receives projection light rays from the projectors to form an image on the screen;
   a coupling device for coupling said screen assembly and said divided units together, said coupling device including a hook pin provided at upper positions of the left and rights units and hook engagement devices provided on an upper portion of the screen assembly for engagement with the hook pins whereby the screen assembly may be openably held on respective front faces of the divided units; and
   a caster assembly at the bottom of each of the divided units to permit independent movement of the divided units.

2. The projection television set according to claim 1, wherein each divided units is further divided into upper and lower units, and each of the upper and lower units has a projector and a reflex mirror for directing projection light rays from the projector to the screen.

3. The projection television set according to claim 2, wherein each of said projectors has three CRTs for R, G and B projecting lenses.

4. The projection television set according to claim 3, wherein the left divided unit has a speaker on a left side thereof, and the right divided unit has a speaker on a right side thereof.

5. The projection television set according to claim 1, wherein said divided units each includes a leveler for fine adjustment.

6. The projection television set according to claim 1, further comprising:
- a body casing having a front face, said body casing provided with a projector portion in its interior;
- a screen assembly mounted on said front face of said body casing, said screen assembly having a frame, and
- a first hook means mounted on said frame of said screen assembly; and
- an associated second hook means mounted on said body casing for engaging with said first hook means to thereby support said screen assembly member freely rotatably about said second hook means.

7. The projection television set according to claim 6, further comprising a support rod means for retaining said screen assembly in an open state after opening said front face of said body casing.

8. The projection television set according to claim 7, wherein said support rod means includes a support rod rotatably mounted on said body casing and detachably retained in said body casing.

9. The projection television set according to claim 1, wherein said body includes a printed circuit board having a deflection drive circuit and a high voltage circuit thereon.

10. The projection television set according to claim 1, wherein each of said divided units includes an upper unit and a lower unit and a setting angle of the reflector corresponding to the lower unit is larger than a setting angle of the reflector corresponding to the upper unit.

11. A projection television set according to claim 1, wherein said circular Fresnel lens comprises four lens section which are bonded to each other, said four lens sections including two sections for the upper units and two sections for the lower units.

12. A projection television set according to claim 11, wherein each of the two lens sections for the upper unit has a circular center ($O_1$) corresponding to each of the upper units and being positioned below an inherent center ($O_0$).

13. The projection television set according to claim 12, wherein said body is composed of right, center and left divided units, each divided unit is further divided into upper and lower units, and each of the upper and lower units has a projector and reflex mirror for directing projection light rays from the projector to the screen.

14. The projection television set according to claim 12, wherein said coupling apparatus, includes a bolt and nut assembly.

15. The projection television set according to claim 12, wherein said divided units each includes a caster assembly for delivery and a leveler for fine adjustment.

16. A projection television set according to claim 1, wherein said lenticular sheet comprises two sheet sections which are bonded to each other.

17. A projection television set comprising:
- a body composed of right, center and left divided units, each unit having at least one projector and one reflex mirror for directing projection light rays from the projector to a screen;
- a screen assembly having an integrally formed screen arranged so that any seam lines of said units disappear and having a circular Fresnel lens and a lenticular sheet which receives projection light rays from the projectors to form an image on the screen;
- a coupling device for coupling said screen assembly and at least said right and left divided units together, said coupling device including a hook pin provided at upper positions of the left and right units and hook engagement devices provided on an upper portion of the screen assembly for engagement with the hook pins whereby the screen assembly may be openably held on respective front faces of the divided units; and
- a caster assembly at the bottom of each of the divided units to permit independent movement of the divided units.

18. The projection television set according to claim 17, wherein each divided unit is further divided into upper and lower units, and each of the upper and lower units has the projector and the reflex mirror for directing projection light rays from the projector to the screen.

19. The projection television set according to claim 12, wherein an eccentric angle between the center ($O_1$) and the inherent center ($O_0$) is approximately 3 degrees.

* * * * *